United States Patent
Root et al.

(10) Patent No.: US 10,240,652 B2
(45) Date of Patent: Mar. 26, 2019

(54) AUTOMATIC SLACK ADJUSTER

(71) Applicant: GUNITE CORPORATION, Rockford, IL (US)

(72) Inventors: Jeffrey Root, Howell, MI (US); Marcello N. Tedesco, Shelby Township, MI (US); David G. Pawczuk, Canton, MI (US)

(73) Assignee: GUNITE CORPORATION, Rockford, IL (US)

( * ) Notice: Subject to any disclaimer, the term of this patent is extended or adjusted under 35 U.S.C. 154(b) by 0 days.

(21) Appl. No.: 14/770,770

(22) PCT Filed: Mar. 11, 2014

(86) PCT No.: PCT/US2014/023581
§ 371 (c)(1),
(2) Date: Aug. 26, 2015

(87) PCT Pub. No.: WO2014/150551
PCT Pub. Date: Sep. 25, 2014

(65) Prior Publication Data
US 2016/0010711 A1      Jan. 14, 2016

Related U.S. Application Data (60) Provisional application No. 61/787,812, filed on Mar. 15, 2013.

(51) Int. Cl.
*F16D 65/60* (2006.01)
*F16D 65/58* (2006.01)
*F16D 125/28* (2012.01)

(52) U.S. Cl.
CPC ............ *F16D 65/60* (2013.01); *F16D 65/58* (2013.01); *F16D 2125/28* (2013.01)

(58) Field of Classification Search
CPC ...... F16D 65/60; F16D 2125/28; F16H 55/12; F16H 55/22; F16H 55/24; F16H 55/28; F16H 57/12
See application file for complete search history.

(56) References Cited

U.S. PATENT DOCUMENTS 3,261,433 A * 7/1966 Page ................. F16D 65/60
188/196 R
3,933,056 A * 1/1976 Taig ................. F16D 65/58
74/399

(Continued)

OTHER PUBLICATIONS

International Search Report for Application No. PCT/US14/23581 dated Jul. 3, 2014 (8 pages).

(Continued)

*Primary Examiner* — Thomas J Williams
*Assistant Examiner* — James K Hsiao
(74) *Attorney, Agent, or Firm* — Michael Best & Friedrich LLP (57) ABSTRACT

A slack adjuster for rotating an input shaft of a braking system includes a housing having an aperture defining a first axis. The slack adjuster also includes an output member positioned within the aperture. The output member is engageable with the input shaft for rotation therewith about a second axis parallel with and offset from the first axis. The slack adjuster also includes an incremental adjustment mechanism operable to impart cycloidal motion to the output member relative to the housing.

20 Claims, 8 Drawing Sheets

(56) References Cited

U.S. PATENT DOCUMENTS

| | | | |
|---|---|---|---|
| 4,196,931 A | 4/1980 | Werner | |
| 4,351,419 A * | 9/1982 | Garrett | F16D 65/18 |
| | | | 188/196 D |
| 4,380,276 A * | 4/1983 | Sweet | F16D 65/60 |
| | | | 188/196 BA |
| 4,384,638 A * | 5/1983 | Crissy | F16D 65/60 |
| | | | 188/196 BA |
| 4,399,894 A * | 8/1983 | Tribe | F16D 55/224 |
| | | | 188/196 BA |
| 4,440,268 A | 4/1984 | Karlsson | |
| 4,491,203 A * | 1/1985 | Monick | F16D 65/567 |
| | | | 188/196 BA |
| 4,544,046 A * | 10/1985 | Lissau | F16D 65/60 |
| | | | 188/79.55 |
| 4,596,319 A * | 6/1986 | Cumming | F16D 65/60 |
| | | | 188/196 BA |
| 5,055,093 A * | 10/1991 | Denker | F16H 1/32 |
| | | | 475/167 |
| 5,195,617 A * | 3/1993 | Clemens | B60T 1/062 |
| | | | 188/196 C |
| 5,350,043 A * | 9/1994 | Crewson | F16D 65/60 |
| | | | 188/196 BA |
| 5,518,197 A * | 5/1996 | Gray | B60R 22/415 |
| | | | 242/382.2 |
| 5,664,647 A * | 9/1997 | Edvardsson | F16D 65/60 |
| | | | 188/79.55 |
| 6,109,556 A * | 8/2000 | Kopetzky | B60R 22/415 |
| | | | 200/61.58 B |
| 6,450,302 B1 * | 9/2002 | Lyons | F16D 65/58 |
| | | | 188/196 BA |
| 6,641,077 B2 * | 11/2003 | Hanna | B60R 22/415 |
| | | | 242/382.2 |
| 7,040,465 B2 | 5/2006 | Jones et al. | |
| 7,083,135 B2 * | 8/2006 | Fleischmann | B60R 22/415 |
| | | | 242/382.1 |
| 7,708,122 B2 | 5/2010 | Plantan et al. | |
| 7,878,594 B2 | 2/2011 | Fukuzawa et al. | |
| 2006/0244296 A1 | 11/2006 | Drew | |
| 2006/0249618 A1 * | 11/2006 | Morgan | B60R 22/415 |
| | | | 242/384 |
| 2010/0122879 A1 * | 5/2010 | Louis | B60T 7/108 |
| | | | 188/79.55 |
| 2014/0166412 A1 * | 6/2014 | Howard | F16D 55/2255 |
| | | | 188/71.8 |
| 2016/0169327 A1 * | 6/2016 | Fujita | B60N 2/2227 |
| | | | 297/361.1 |

OTHER PUBLICATIONS

Written Opinion of the International Searching Authority for Application No. PCT/US14/23581 dated Jul. 3, 2014 (5 pages).

* cited by examiner

AUTOMATIC SLACK ADJUSTER

CROSS-REFERENCE TO RELATED APPLICATIONS

This application claims priority to U.S. Provisional Patent Application No. 61/787,812 filed on Mar. 15, 2013, the entire content of which is incorporated herein by reference.

FIELD OF THE INVENTION

The present invention relates to slack adjusters, and more particularly to automatic slack adjusters for use with vehicle braking systems

BACKGROUND OF THE INVENTION

Some types of commercial or heavy-duty vehicles, requiring high power braking systems, employ slack adjustment devices to compensate for brake lining wear. Brake lining wear causes a gradual increase in the brake stroke with a resulting decrease in braking efficiency. Some slack adjustment devices, often referred to as automatic slack adjusters, include an adjustment mechanism that provides substantially automatic compensation for the wear of the brake linings. Many types of automatic slack adjusters rely on a worm and worm gear combination for the adjustment mechanism. In such units, the force of braking is generally applied in a "series" manner, through the adjustment mechanism itself, to an input shaft of the braking system, (i.e., from a brake actuator, through the worm to the worm gear, and to the input shaft). These adjusters, therefore, carry tremendous loads on their gears and other parts. This invites problems of wear, maintenance, reliability and, consequently, increased costs.

SUMMARY OF THE INVENTION

A slack adjuster for rotating an input shaft of a braking system includes a housing having an aperture defining a first axis. The slack adjuster also includes an output member positioned within the aperture. The output member is engageable with the input shaft for rotation therewith about a second axis parallel with and offset from the first axis. The slack adjuster also includes an incremental adjustment mechanism operable to impart cycloidal motion to the output member relative to the housing.

In another aspect, the incremental adjustment mechanism couples the housing and the output member for angularly reorienting the output member relative to the housing. The incremental adjustment mechanism includes a plurality of rotatable components. Each of the rotatable components is rotatable about an axis that is parallel with the first and second axes.

A method of reducing slack in a vehicle braking system with an input shaft includes providing a housing having an aperture defining a first axis, positioning an output member within the aperture and engaging the output member with the input shaft for rotation therewith, rotating the housing and the input shaft about a second axis parallel to and offset from the first axis, and imparting cycloidal motion to the output member relative to the housing with an incremental adjustment mechanism.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
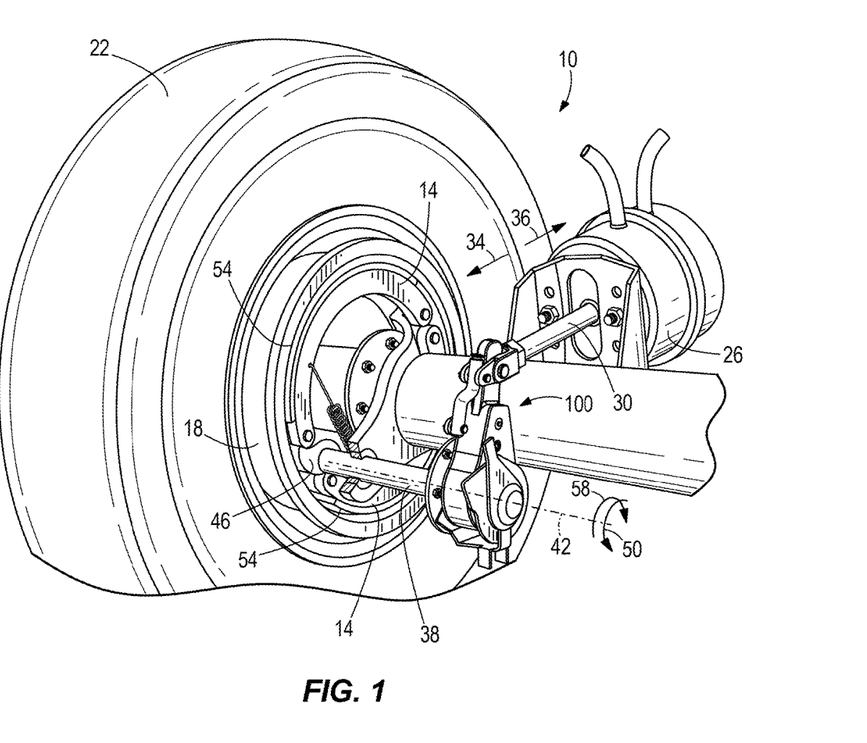
FIG. 1 is a perspective view of a slack adjuster according to an embodiment of the invention incorporated within a vehicle braking system.

FIG. 1 illustrates a vehicle braking system 10 according to an embodiment of the invention. The illustrated vehicle braking system 10 is a pneumatic drum braking system, such as the type commonly used in commercial vehicles (e.g., semi-trucks), and includes brake shoes 14 and a brake drum 18 associated with a wheel 22 of the vehicle. The braking system 10 also includes an air chamber 26 and a push rod 30 operably coupled to the air chamber 26. Activation of the braking system 10 sends pressurized air to the air chamber 26 to extend the push rod 30 in the direction of arrow 34 to apply a braking force. The push rod 30 is coupled to a slack adjuster 100 that acts as a lever to convert generally linear movement of the push rod 30 to rotary movement of an input shaft 38 of the braking system 10. The input shaft 38 (also known as a cam shaft) defines a longitudinal axis 42 (referred to herein as the first axis) and includes an S-shaped cam 46 that applies the braking force to the brake shoes 14. Rotation of the input shaft 38 in a first direction 50 (e.g., counter-clockwise) spreads the brake shoes 14 to engage friction linings 54 of the brake shoes with the brake drum 18. Rotation of the input shaft 38 in a second direction 58 (e.g., clockwise) as the push rod 30 retracts in the direction of arrow 36 allows the brake shoes 14 to contract away from the brake drum 18. Over time, the friction linings 54 of the brake shoes 14 and/or brake drum 18 wear down, increasing the clearance (slack) between the brake shoes 14 and the brake drum 18. The slack adjuster 100 automatically takes up the slack in the braking system 10 to provide consistent braking performance.

Figure 2:
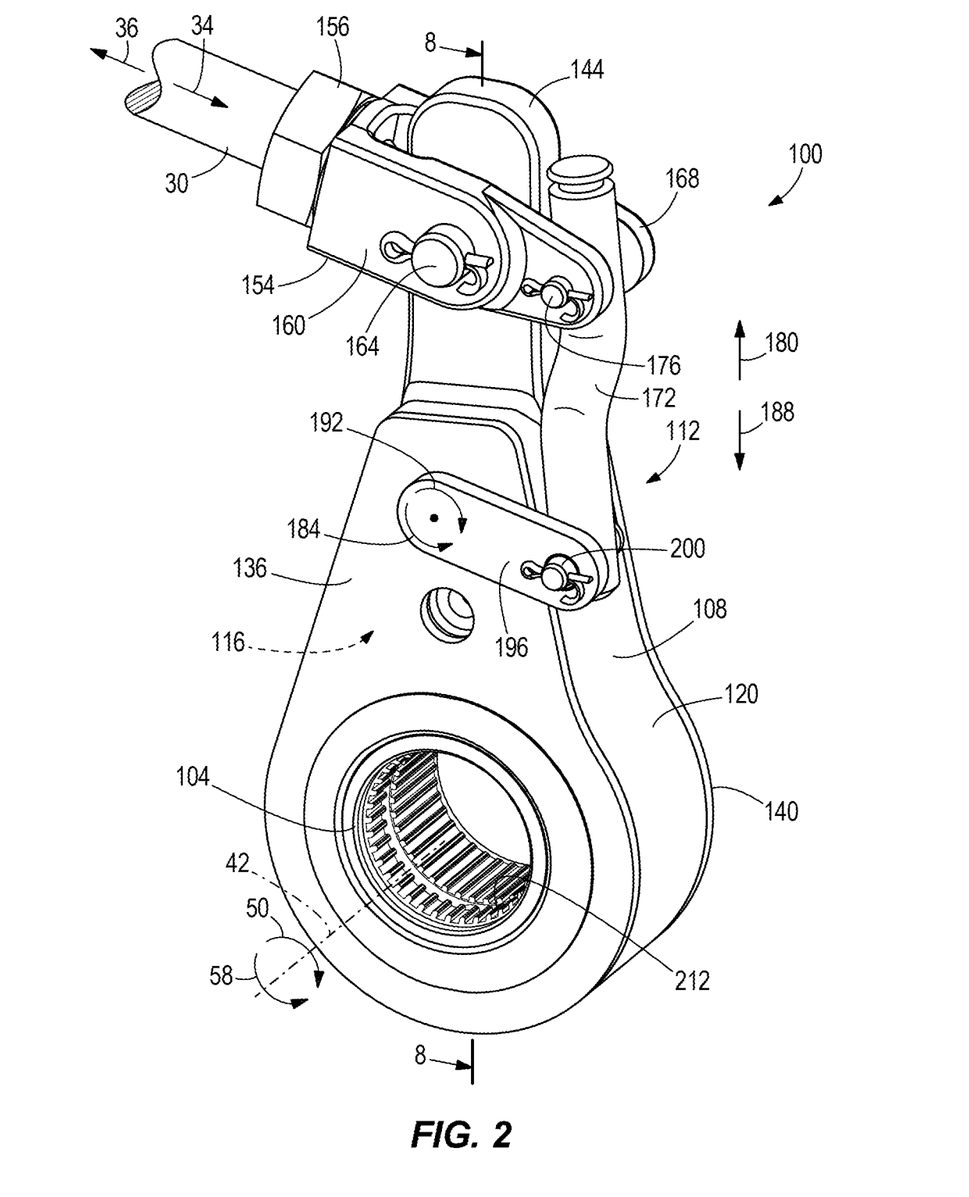
FIG. 2 is a perspective view of the slack adjuster of FIG. 1.
Figure 3:
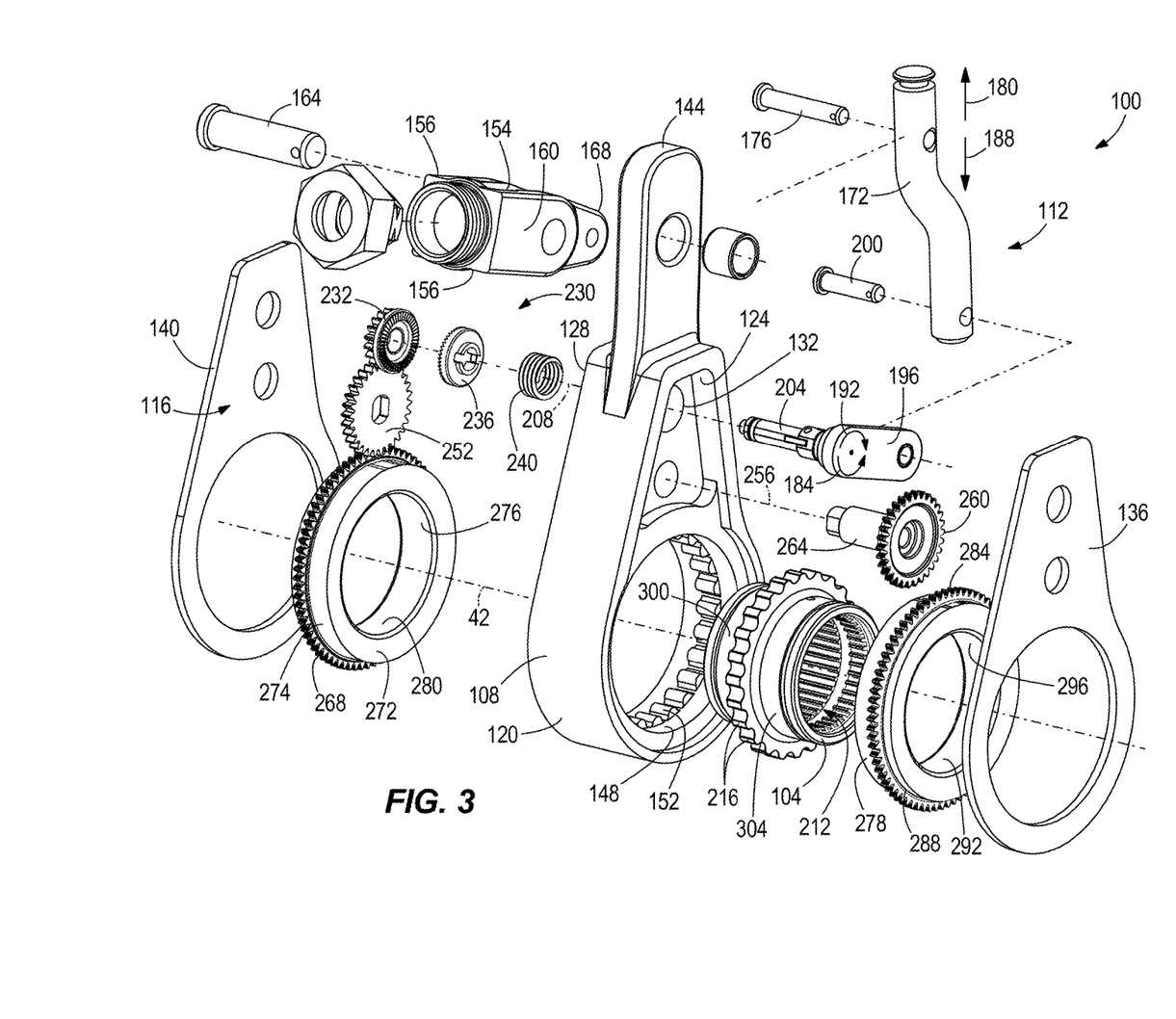
FIG. 3 is an exploded perspective view of the slack adjuster of FIG. 2.

With reference to FIGS. 2 and 3, the slack adjuster 100 includes an output member or output gear 104 coupled to the input shaft 38 (FIG. 1) of the braking system 10, a housing 108 surrounding the output gear 104, a motion transmitting assembly 112 coupled to the housing 108, and an incremental adjustment mechanism 116 disposed within the housing 108 and operable to adjust the relative angular position between the housing 108 and the output gear 104. The housing 108 includes a body 120 having an inboard cavity 124 (FIG. 3) and an outboard cavity 128 (FIG. 7) separated from the inboard cavity 124 by a wall 132 (FIG. 3). The terms "outboard" and "inboard" as used herein refer to sides of the slack adjuster 100 generally facing toward and away from the wheel 22, respectively, when the slack adjuster 100 is installed in the braking system 10. The housing 108 also includes an inboard cover plate 136 and an outboard cover plate 140 that seal the respective inboard and outboard cavities 124, 128 to protect the incremental adjustment mechanism 116.

The body 120 includes an upwardly projecting flange 144 for receiving the braking force from the push rod 30. The body 120 also includes a main aperture 148 having a plurality of radially inward-extending teeth 152 arranged around the inner circumference of the main aperture 148 (FIG. 3). In the illustrated embodiment, the body 120 is formed as a single, cast piece. In other embodiments, the body 120 can have any suitable shape, include any number of pieces, and be formed by any suitable method or combination of methods (e.g., machining, stamping, etc.).

With continued reference to FIGS. 2 and 3, the motion transmitting assembly 112 is configured to convert linear motion of the push rod 30 into rotation of the housing 108 (and the input shaft 38) about the first axis 42 and to provide a rotational input to the incremental adjustment mechanism 116. With reference to FIG. 2, the motion transmitting assembly 112 includes a yolk-shaped clevis 154 having a proximal portion 156 coupled to the push rod 30, a middle portion 160 pivotally coupled to the flange 144 of the body 120 by a first pin 164, and a distal portion 168 pivotally coupled to a link member 172 by a second pin 176. This coupling arrangement causes the link member 172 to move in the direction of arrow 180 (i.e., upward from the frame of reference of FIG. 2) when the braking system 10 is activated to rotate the housing 108 about the first axis 42 in the direction of arrow 50. Conversely, when the braking system 10 is deactivated, the link member 172 moves in the direction of arrow 188 (i.e., downward from the frame of reference of FIG. 2) as the housing 108 rotates about the first axis 42 in the direction of arrow 58. The motion transmitting assembly 112 also includes a crank arm 196 pivotally coupled to the link member 172 by a third pin 200. The crank arm 196 includes a shaft 204 that extends through the housing 108 to provide a rotational input to the incremental adjustment mechanism 116 (FIG. 3). The shaft 204 defines a longitudinal axis 208 (referred to herein as the second axis) oriented substantially parallel to the first axis 42. The crank arm 196 and its shaft 204 rotate in the direction of arrow 184 in response to the upward movement of the link member 172 in the direction of arrow 180, and the crank arm 196 and its shaft 204 rotate in the direction of arrow 192 in response to downward movement of the link member 172 in the direction of arrow 188. The motion transmitting assembly 112 generally functions as a four bar linkage and converts linear movement of the push rod 30 to rotational movement of the housing 108 and the crank arm 196.

Figure 4:
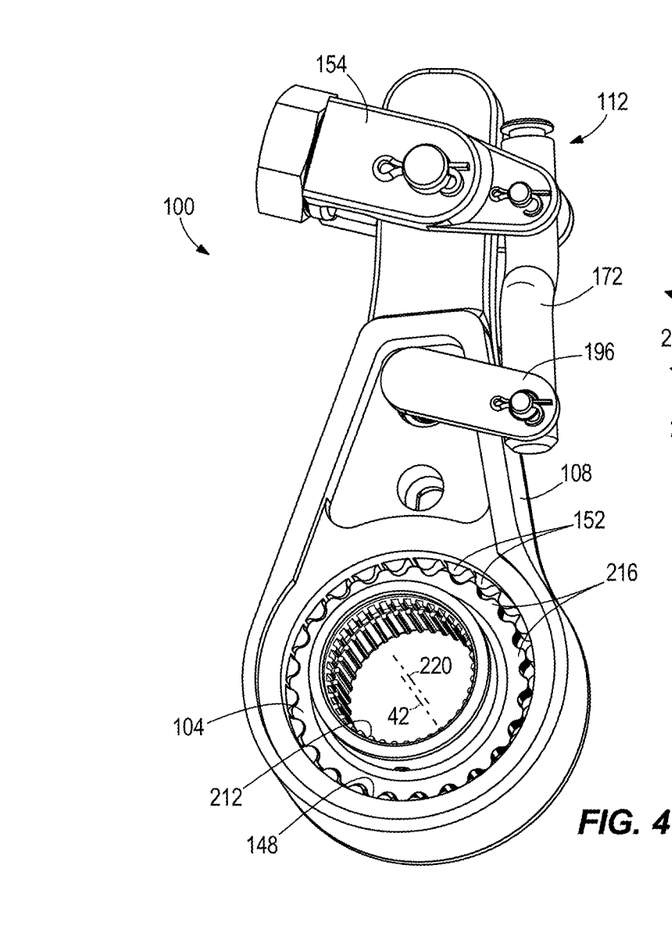
FIG. 4 is a perspective view of the slack adjuster of FIG. 2, with portions removed.
Figure 5:
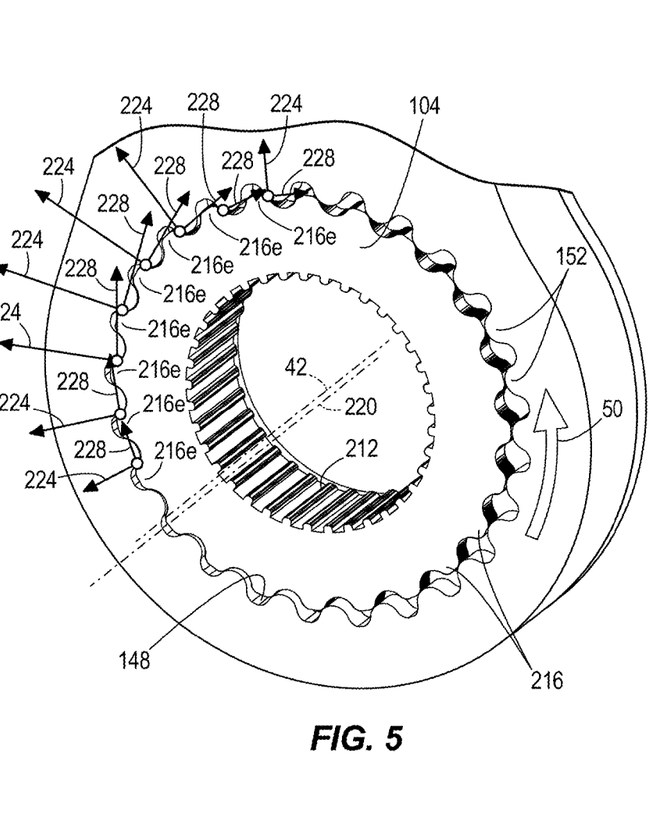
FIG. 5 is an enlarged view of the portion of the slack adjuster shown in FIG. 4.

Now referring to FIGS. 4 and 5, the output gear 104 includes a bore 212 in which the input shaft 38 of the braking system 10 is inserted by a cooperating spline pattern or other suitable arrangement. The output gear 104 co-rotates with the input shaft 38 about the first axis 42. The output gear 104 includes a plurality of radially outward-extending teeth 216 cycloidally meshed with the radially inward-extending teeth 152 on the housing 108 to transmit a braking torque to the input shaft 38 of the braking system 10. As illustrated in FIG. 5, the main aperture 148 defines a third axis 220 substantially parallel with and offset from the first axis 42. The output gear 104 is eccentrically positioned within the main aperture 148, and approximately one third of the teeth 216e of the output gear 104 are engaged with the teeth 152 of the housing 108 at any given time. The braking force applied from the housing 108 to the output gear 104 as the housing 108 rotates in the direction of arrow 50 (FIG. 5) is divided amongst the engaged teeth 216e and can be resolved into a normal reaction force component 224 and a tangential reaction force component 228 applied to each of the engaged teeth 216e of the output gear 104. No axial reaction force component is produced. The eccentric, cycloidal arrangement of the output gear 104 and the main aperture 148 allows the incremental adjustment mechanism 116 to reorient the output gear 104 relative to the housing 108, as will be described in greater detail below.

With reference to FIGS. 6-9, the incremental adjustment mechanism 116 includes a clutch mechanism 230 disposed within the outboard cavity 128 of the housing 108 and coupled to the shaft 204 of the crank arm 196. In the illustrated embodiment, the clutch mechanism 230 includes a drive gear 232, a clutch gear 236, and a spring 240 biasing the clutch gear 236 into engagement with the drive gear 232. The clutch gear 236 is engaged with the shaft 204 by a suitable spline or key/keyway pattern such that the clutch gear 236 co-rotates with the shaft 204 and is slidable along the shaft 204. The drive gear 232 is maintained adjacent the plate 140 by the clutch gear 236 and the spring 240, and is rotatable relative to the shaft 204. The drive gear 232 and the clutch gear 236 each include cooperating, axially-facing ratchet teeth 244, 248 (best illustrated in FIGS. 10A-D). The ratchet teeth 244 of the drive gear 232 each include a bearing surface 245 and a sliding surface 246 intersecting in a tip or crest 247. Similarly, the ratchet teeth 248 of the clutch gear 236 each include a bearing surface 249 and a sliding surface 250 intersecting in a tip or crest 251. During operation of the incremental adjustment mechanism 116, the cooperating ratchet teeth 244, 248 allow the clutch gear 236 to selectively slip relative to the drive gear 232, as will be described in greater detail below. In other embodiments, the clutch gear 236 and/or the ratchet teeth 244, 248 can be replaced by any suitable clutch mechanism, such as a friction clutch.

Figure 8:
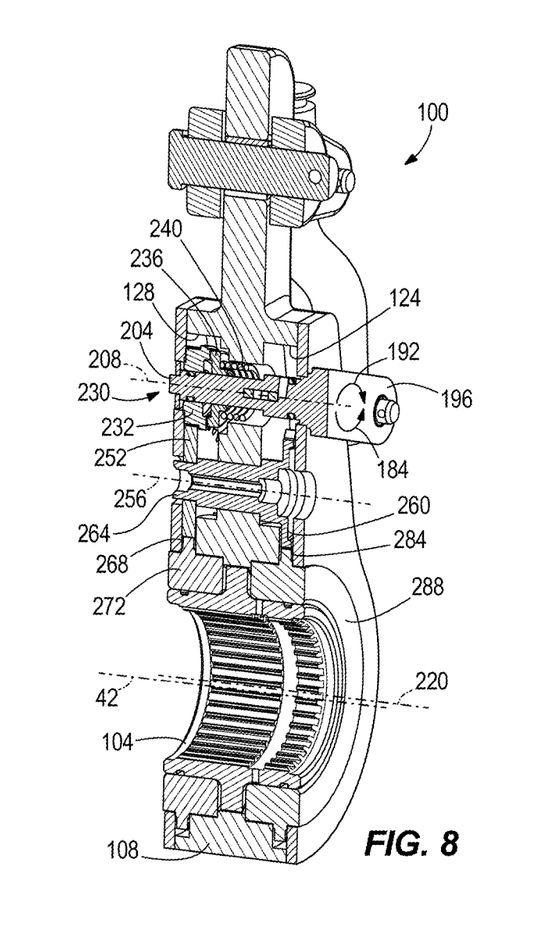
FIG. 8 is a cross-sectional view of the slack adjuster of FIG. 2, taken through line 8-8 of FIG. 2.
Figure 9:
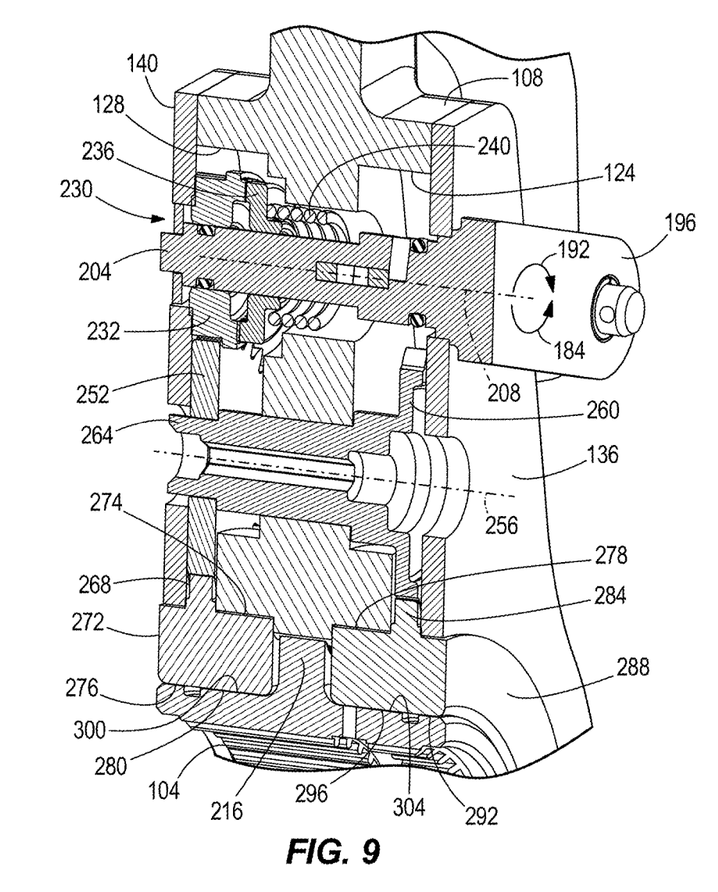
FIG. 9 is an enlarged view of the portion of the slack adjuster shown in FIG. 8.

The incremental adjustment mechanism 116 also includes a first idler gear 252 disposed within the outboard cavity 128 and meshed with the drive gear 232 for rotation about a fourth axis 256 substantially parallel to the first, second, and third axes 42, 208, 220 (FIG. 8). The first idler gear 252 is driven by the drive gear 232, and the first idler gear 252, in turn, drives a second idler gear 260. The second idler gear 260 is disposed within the inboard cavity 124 and includes an integrally-formed intermediate shaft 264 (FIGS. 3 and 9). The intermediate shaft 264 extends through the housing 108 to couple the second idler gear 260 to the first idler gear 252 for co-rotation. Accordingly, rotation of the drive gear 232 rotates both the first and second idler gears 252, 260 simultaneously.

Figure 6:
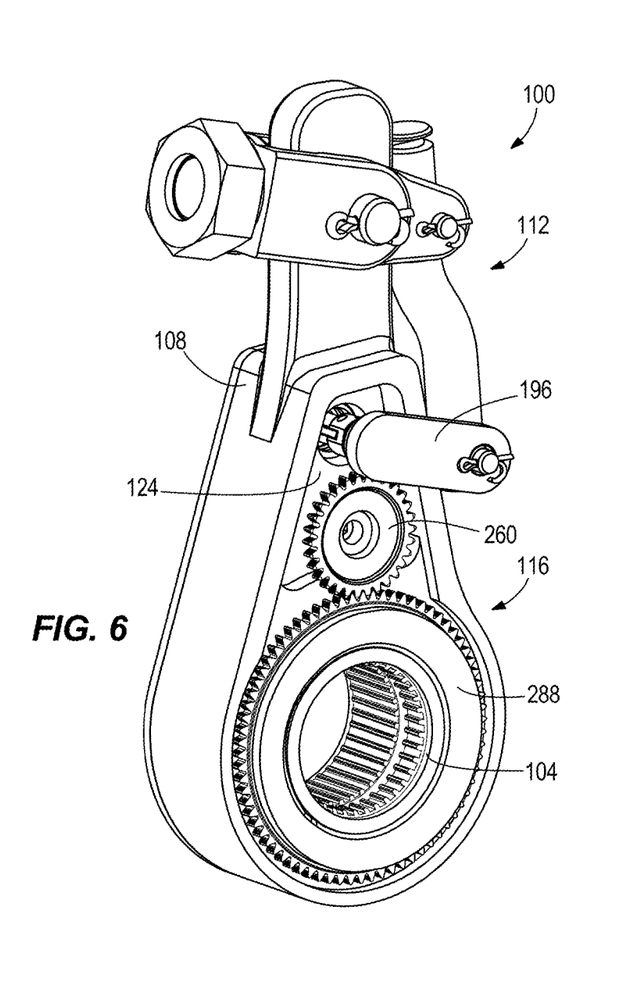
FIG. 6 is a perspective view of the slack adjuster of FIG. 2 with an inboard cover removed.
Figure 7:
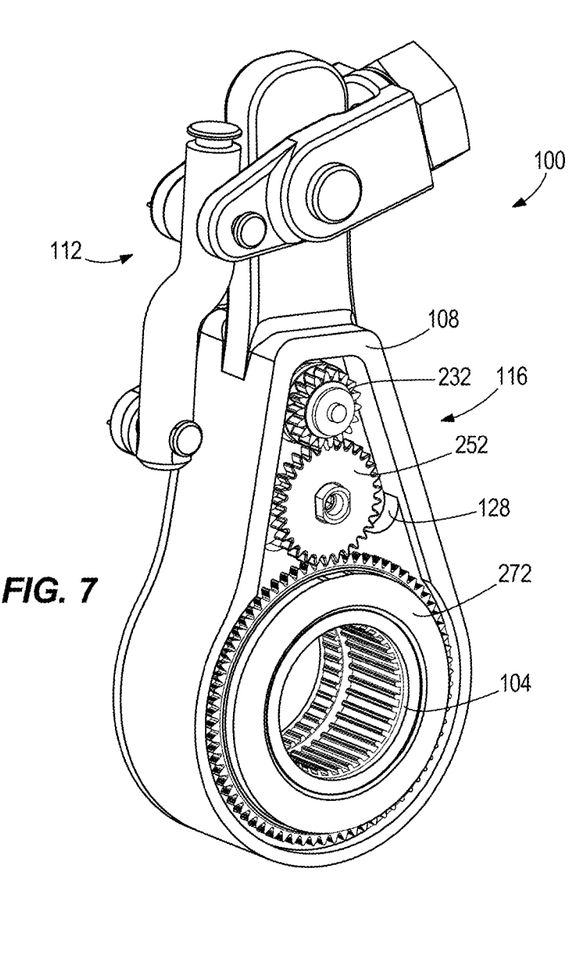
FIG. 7 is a perspective view of the slack adjuster of FIG. 2 with an outboard cover removed.

The incremental adjustment mechanism 116 further includes first and second cam rings 272, 288 that eccentrically support the output gear 104 within the main aperture 148 of the housing 108 (FIG. 3). The first cam ring 272 includes an outer circumferential bearing surface 274 slidably engaged with the main aperture 148 to concentrically align and support the first cam ring 272 within the main aperture 148. The first idler gear 252 meshes with external teeth 268 of the first cam ring 272 within the outboard cavity 128, and the first cam ring 272 rotates within the main aperture 148 in response to rotation of the first idler gear 252 (FIG. 7). The first cam ring 272 includes a bore 276 defined by an annular bearing surface 280 of the first cam ring 272 and formed eccentrically in the first cam ring 272 (FIGS. 3 and 9). Similarly, the second cam ring 288 includes an outer circumferential bearing surface 278 slidably engaged with the main aperture 148 to concentrically align and support the second cam ring 288 within the main aperture 148. The second idler gear 260 meshes with external teeth 284 of the second cam ring 288 within the inboard cavity 124, and the second cam ring 288 rotates within the main aperture 148 in response to rotation of the second idler gear 260 (FIG. 6). The second cam ring 288 includes a bore 292 defined by an annular bearing surface 296 of the second cam ring 288 and formed eccentrically in the second cam ring 288 (FIGS. 3 and 9).

The bearing surfaces 280, 296 of the first and second cam rings 272, 288 are engageable with corresponding bearing surfaces 300, 304 located on the exterior of the output gear 104 (FIGS. 3 and 9). The bearing surfaces 280, 296 of the first and second cam rings 272, 288 position the output gear 104 within the main aperture 148 of the housing 108. Due to the eccentricity of the bores 276, 292 in the first and second cam gears 272, 288, rotation of the cam gears 272, 288 causes the output gear 104 to undergo cycloidal movement relative to the housing 108 (i.e., when viewed from a frame of reference of the housing 108), with the teeth 216e on the output gear 104 engaging a different group of teeth 152 on the housing 108 for each consecutive cycloidal motion of the output gear 104. As will be described in greater detail below, the cycloidal movement of the output gear 104 relative to the housing 108 alters the relative angular position between the housing 108 and the output gear 104 to take up slack in the braking system 10.

Figure 10A:
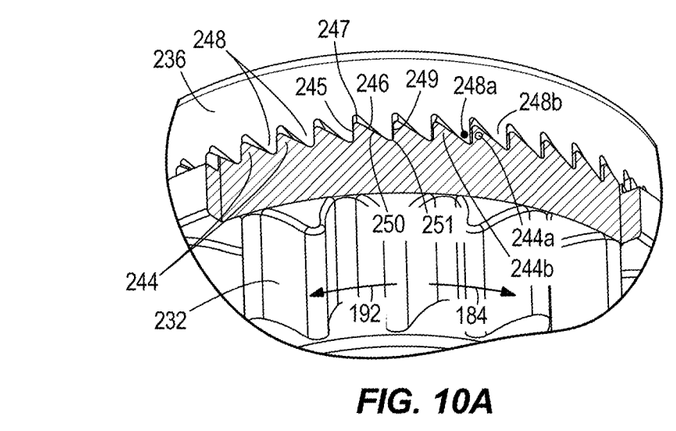
FIG. 10A is an enlarged view of a portion of a clutch mechanism of the slack adjuster of FIG. 2 in a fully-engaged position.
Figure 10B:
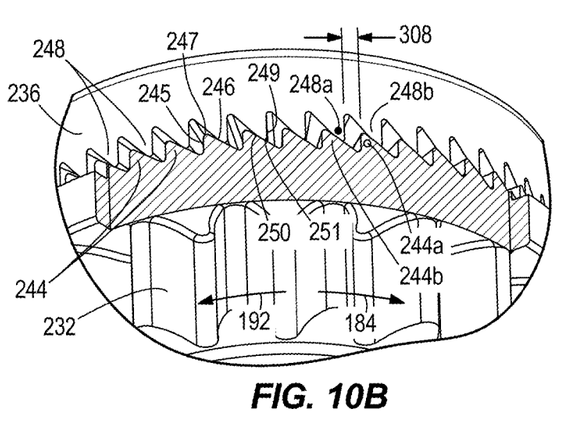
FIG. 10B is an enlarged view of the portion of the clutch mechanism shown in 10A in an intermediate position.

In operation, the slack adjuster 100 may not be required to make an adjustment on every activation of the braking system 10 (e.g., if the brake pads 14 are new or if the incremental adjustment mechanism 116 just made an adjustment). In this case, the clutch gear 236 is in an intermediate position (FIG. 10B) when the braking system 10 is activated. The push rod 30 extends in the direction of arrow 34 to apply a braking force to the housing 108 of the slack adjuster 100, causing the housing 108 to pivot about the first axis 42 in the direction of arrow 50 (FIG. 2). The engagement between the teeth 216e of the output gear 104 and the teeth 152 of the housing 108 transmits a braking torque to the input shaft 38 with the output gear 104 and causes the output gear 104 to rotate the input shaft 38 (FIGS. 1 and 5). As the housing 108 pivots, the clevis 154 pivots about the first pin 164 and draws the link member 172 upward, in the direction of arrow 180 (FIG. 2). The upward movement of the link member 172 rotates the crank arm 196 in the direction of arrow 184, which in turn rotates the clutch gear 236 in the direction of arrow 184 (FIGS. 3 and 9). In the intermediate position of the clutch gear 236, a gap 308 exists between the bearing surface 245 of a drive gear ratchet tooth 244a and the bearing surface 249 of a clutch gear ratchet tooth 248a (FIG. 10B). As the crank arm 196 rotates the clutch gear 236 during the application stroke of the braking system 10, the sliding surface 250 of the ratchet tooth 248a slides along the sliding surface 246 of an adjacent ratchet tooth 244b in the direction of arrow 184, to close the gap 308. During this time, the drive gear 232 does not rotate, and therefore, the incremental adjustment mechanism 116 does not advance. In this case, because no adjustment is necessary, the brake shoes 14 engage with the brake drum 18 before the gap 308 fully closes.

When the braking system 10 is deactivated, the push rod 30 retracts in the direction of arrow 36, causing the housing 108 to pivot about the first axis 42 in the direction of arrow 58 (FIG. 2). As the housing 108 pivots, the motion transmitting assembly 112 operates in reverse, which in turn rotates the clutch gear 236 in the direction of arrow 192, increasing the gap 308 between the bearing surfaces 245 and 249 of the ratchet teeth 244a and 248a (FIG. 10B).

Figure 10C:
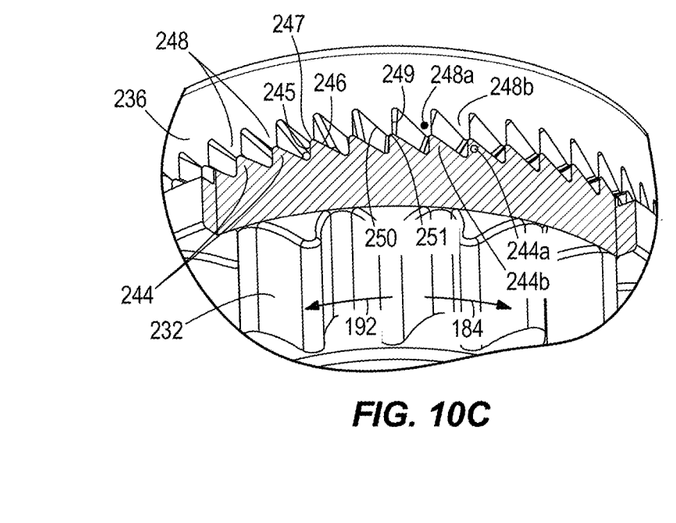
FIG. 10C is an enlarged view of the portion of the clutch mechanism shown in 10A in a critical position.
Figure 10D:
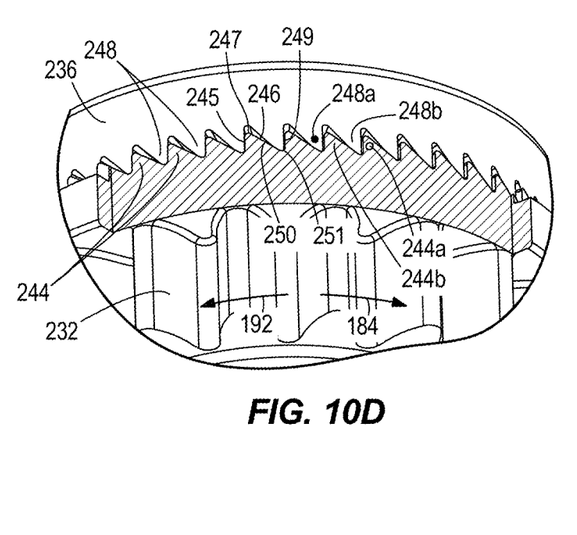
FIG. 10D is an enlarged view of the portion of the clutch mechanism shown in 10A in a fully-engaged position.

As the friction linings 54 wear, each additional activation of the braking system 10 must rotate the housing 108 and therefore, the clutch gear 236, (via the motion transmitting assembly 112) slightly farther in order to engage the brake shoes 14 with the brake drum 18. Accordingly, the housing 108 and the clutch gear 236 must also rotate slightly farther to return when the braking system 10 is deactivated. Eventually, the clutch gear 236 reaches a critical point where the crest 251 of the clutch gear ratchet tooth 248a reaches the crest 247 of the drive gear ratchet tooth 244b (FIG. 10C). The clutch gear 236 then snaps into a fully-engaged position with the drive gear 232, under the biasing force of the spring 240 (FIGS. 9 and 10D). In the fully-engaged position, the bearing surface 249 of an adjacent clutch gear ratchet tooth 248b abuts the bearing surface 245 of the drive gear ratchet tooth 244a, and the bearing surface 249 of the clutch gear ratchet tooth 248a abuts the bearing surface 245 of the drive gear ratchet tooth 244b.

On the next activation of the braking system 10 following the clutch gear 236 assuming the position shown in FIG. 10D, the push rod 30 extends in the direction of arrow 34, causing the housing 108 of the slack adjuster 100 to pivot about the first axis 42 in the direction of arrow 50. As previously described, the motion transmitting assembly 112 rotates the clutch gear 236 in the direction of arrow 184. Because the clutch gear 236 is in the fully-engaged position, the clutch gear rotates the drive gear 232 (FIG. 10D). In turn, the drive gear 232 rotates the first idler gear 252, which simultaneously drives the second idler gear 260 (FIGS. 8 and 9). The idler gears 252, 260 then incrementally and simultaneously rotate the cam gears 272, 288, respectively. As the cam gears 272, 288 are rotated about the output gear 104, the eccentricity of the bores 276, 292 imparts a cycloidal motion to the output gear 104, causing the teeth 216e on the output gear 104 to disengage a first group of teeth 152 on the housing 108 and engage a second group of teeth 152 on the housing 108. In this manner, the output gear 104 is incrementally and angularly reoriented relative to the housing 108 if the frame of reference is the housing 108. This motion is best illustrated in FIGS. 11A-D. Alternatively, the housing 108 is incrementally and angularly reoriented relative to the output gear 104 if the frame of reference is the output gear 104, or the input shaft 38 of the braking system 10.

Figure 11A:
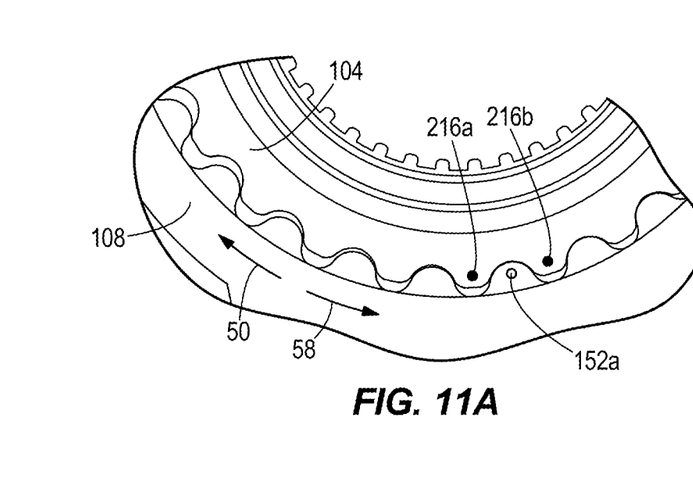
FIG. 11A is an enlarged view of a portion of an output gear and a housing of the slack adjuster of FIG. 2 in a reference position.
Figure 11B:
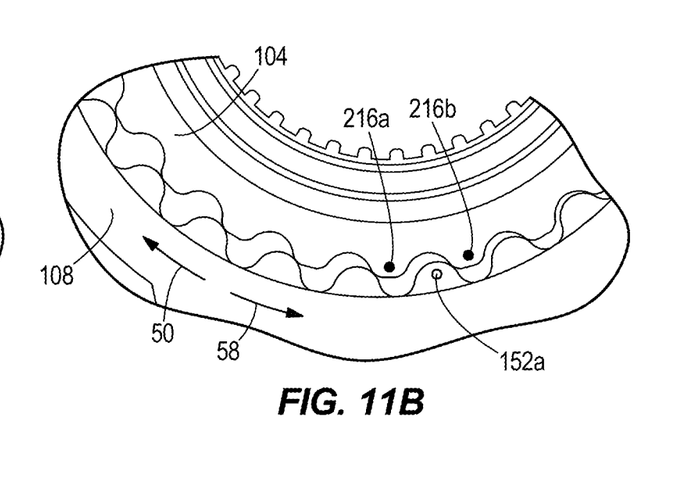
FIG. 11B is an enlarged view of the portion of the output gear and housing shown in FIG. 11A in a first adjusted position.
Figure 11C:
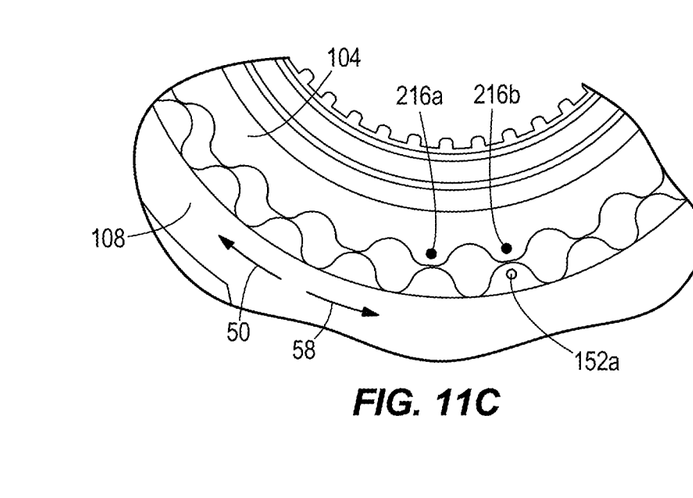
FIG. 11C is an enlarged view of the portion of the output gear and housing shown in FIG. 11A in a second adjusted position.
Figure 11D:
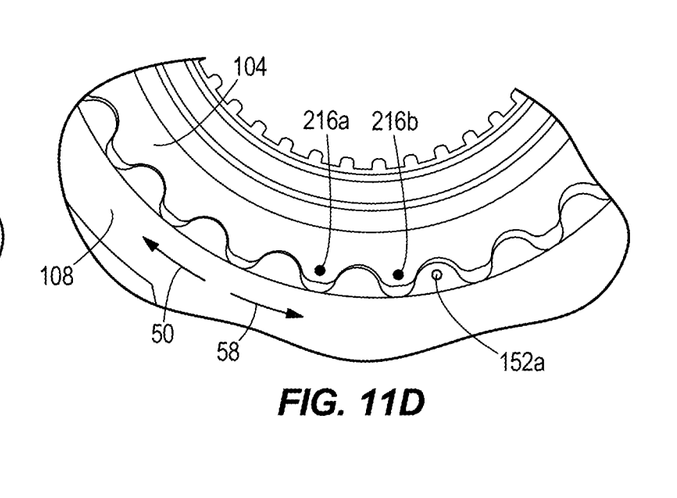
FIG. 11D is an enlarged view of the portion of the output gear and housing shown in FIG. 11A in a third adjusted position.

FIG. 11A illustrates a reference position of the output gear 104 and the housing 108 (e.g., just before the slack adjuster 100 makes an adjustment). A tooth 216a of the output gear 104 is positioned generally adjacent a tooth 152a of the housing 108. Upon activation of the braking system 10 (with the clutch gear 236 in the fully-engaged position, as described above), the cam gears 272, 288 rotate and cause the output gear 104 to undergo a cycloidal motion relative to the housing 108 (when viewed from a frame of reference of the housing 108) in the direction of arrow 50. As the output gear 104 undergoes the cycloidal motion, the teeth 152a, 216a first disengage (FIGS. 11B and 11C) and then the tooth 152a engages an adjacent tooth 216b on the output gear 104, with the end result being an angular reorientation of the output gear 104 relative to the housing 108. Consequently, the slack adjuster 100 may be rotated in the direction 50 through a smaller angle, compared to the rotation angle of the slack adjuster 100 immediately preceding the above-described adjustment when a significant amount of clearance or slack existed between the brake shoes 14 and the drum 18, before the brake shoes 14 are spread by the cam 46 to engage the drum 18. Although the angular reorientation of the output gear 104 relative to the housing 108 is illustrated in FIGS. 11A-11D as a discrete amount coinciding with the pitch of the teeth 216, it should be understood that any degree of reorientation between the output gear 104 and the housing 108 is possible (e.g., a fraction of the pitch of the teeth 216).

Various features of the invention are set forth in the following claims.

What is claimed is:

1. A slack adjuster for rotating an input shaft of a vehicle braking system, the slack adjuster comprising:
   a housing including an aperture defining a first axis;
   an output member positioned within the aperture and engaged with the input shaft of the vehicle braking system for rotation therewith about a second axis parallel to and offset from the first axis; and
   an incremental adjustment mechanism for imparting cycloidal motion to the output member relative to the housing,
   wherein the incremental adjustment mechanism includes a clutch gear, a drive gear coaxial and co-rotatable with the clutch gear, and a spring configured to bias the clutch gear into engagement with the drive gear.

2. The slack adjuster of claim 1, wherein the incremental adjustment mechanism includes a plurality of rotatable components.

3. The slack adjuster of claim 2, wherein each of the plurality of rotatable components is rotatable about an axis that is parallel with the first axis.

4. The slack adjuster of claim 1, wherein the housing includes a plurality of radially inward-extending teeth and the output member includes a plurality of radially outward-extending teeth cycloidally meshed with the inward-extending teeth of the housing.

5. The slack adjuster of claim 1, wherein the clutch gear and the drive gear include cooperating ratchet teeth that allow the clutch gear to selectively slip relative to the drive gear during operation of the incremental adjustment mechanism.

6. The slack adjuster of claim 1, wherein the incremental adjustment mechanism further includes a cam ring, and wherein rotation of the drive gear rotates the cam ring.

7. The slack adjuster of claim 6, wherein the cam ring includes an eccentric bore in which at least a portion of the output member is received.

8. The slack adjuster of claim 1, further comprising:
   a link;
   a clevis attached to the housing via a first pin and attached to the link via a second pin; and
   a crank arm attached to the link via a third pin and operable to provide a rotational input to the incremental adjustment mechanism.

9. A slack adjuster for rotating an input shaft of a vehicle braking system, the slack adjuster comprising:
   a housing including an aperture defining a first axis;
   an output member positioned within the aperture and engaged with the input shaft of the vehicle braking system for rotation with the input shaft about a second axis parallel to the first axis; and
   an incremental adjustment mechanism coupling the housing and the output member for angularly reorienting the output member relative to the housing;
   wherein the incremental adjustment mechanism includes a plurality of rotatable components, and wherein each of the rotatable components is rotatable about an axis that is parallel with the first and second axes, and
   wherein the incremental adjustment mechanism includes a clutch gear, a drive gear coaxial and co-rotatable with the clutch gear, and a spring configured to bias the clutch gear into engagement with the drive gear.

10. The slack adjuster of claim 9, wherein the incremental adjustment mechanism is operable to impart cycloidal motion to the output member.

11. The slack adjuster of claim 9, wherein the housing includes a plurality of radially inward-extending teeth and the output member includes a plurality of radially outward-extending teeth cycloidally meshed with the inward-extending teeth of the housing.

12. The slack adjuster of claim 1, wherein the clutch gear and the drive gear include cooperating ratchet teeth that allow the clutch gear to selectively slip relative to the drive gear during operation of the incremental adjustment mechanism.

13. The slack adjuster of claim 1, wherein the incremental adjustment mechanism further includes a cam ring, and rotation of the drive gear rotates the cam ring.

14. The slack adjuster of claim 13, wherein the cam ring includes an eccentric bore in which at least a portion of the output member is received.

15. The slack adjuster of claim 9, further comprising:
   a link;
   a clevis attached to the housing via a first pin and attached to the link via a second pin; and
   a crank arm attached to the link via a third pin and operable to provide a rotational input to the incremental adjustment mechanism.

16. A method of reducing slack in a vehicle braking system including an input shaft, the method comprising:
   providing a housing including an aperture defining a first axis;
   positioning an output member within the aperture and engaging the output member with the input shaft for rotation therewith;

rotating the housing and the input shaft about a second axis parallel to and offset from the first axis; and imparting cycloidal motion to the output member relative to the housing with an incremental adjustment mechanism including a drive gear and a clutch gear coaxial with the drive gear, wherein imparting cycloidal motion to the output member includes engaging and rotating the drive gear with the clutch gear.

17. The method of claim 16, further comprising changing a relative angular position between the output member and the housing in response to imparting cycloidal motion to the output member relative to the housing.

18. The method of claim 16, further comprising rotating a cam ring about the first axis relative to the housing to impart cycloidal motion to the output member.

19. The method of claim 16, wherein imparting cycloidal motion to the output member includes rotating the drive gear and the clutch gear about an axis that is parallel with the first and second axes.

20. The method of claim 16, further comprising transmitting a braking torque to the input shaft with the output member, via a plurality of cycloidally meshed teeth on the output member and the housing, in response to applying a braking force to the housing.

* * * * *